United States Patent [19]

Hertzel et al.

[11] Patent Number: 5,523,544
[45] Date of Patent: Jun. 4, 1996

[54] PERFORATED VACUUM TRANSPORT DRUM AND METHOD OF MANUFACTURE

[75] Inventors: Gerald T. Hertzel; Eugene G. Hill, both of Rochester, N.Y.

[73] Assignee: Eastman Kodak Company, Rochester, N.Y.

[21] Appl. No.: 43,321

[22] Filed: Apr. 6, 1993

[51] Int. Cl.⁶ .................................................. B23K 26/00
[52] U.S. Cl. .................................. 219/121.7; 219/121.71
[58] Field of Search ...................... 219/121.11, 121.6, 219/121.67, 121.7, 121.71

[56] References Cited

U.S. PATENT DOCUMENTS

| | | | |
|---|---|---|---|
| Re. 27,772 | 10/1973 | Hanfmann | 219/121 LM |
| 3,388,461 | 6/1968 | Lins | 219/121.62 |
| 3,410,979 | 11/1968 | Larsson | 219/68 |
| 3,594,261 | 7/1971 | Broerman | 219/68 |
| 3,808,394 | 4/1974 | Mominee et al. | 219/121 LM |
| 3,985,953 | 10/1976 | Dunkley | 178/6.6 B |
| 4,156,807 | 5/1979 | Howard et al. | 219/121 EM |
| 4,317,023 | 2/1982 | Gryskiewicz | 219/121 LN |
| 4,322,600 | 3/1982 | Crahay | 219/121 LK |
| 4,458,134 | 7/1984 | Ogle | 219/121 LK |
| 4,857,698 | 8/1989 | Perun | 219/121.7 |
| 5,006,900 | 4/1991 | Baughman et al. | 355/271 |
| 5,119,550 | 6/1992 | Baughman et al. | 29/825 |

*Primary Examiner*—Tu Hoang

[57] ABSTRACT

A process for perforating a urethane anti-static filled coating of a metallic drum core with clean holes of substantially uniform size and shape. The process includes placing an electrically conducting absorbing tape between the urethane coating and the metallic core to absorb the urethane melt generated by the laser cutting process. The coated core after being placed in a fixture, is subjected to a laser beam generated by a pulsed CO2 gas laser that passes through a set of rotary optics capable of spinning the beam in circles as it passes through a gas jet/nozzle assembly before beam impact with the coating. Through the use of conductive tape a good ground may be maintained between the anti-static filled coating and the metallic core to prevent static build up on the outer surface of the drum.

12 Claims, 3 Drawing Sheets

PERFORATED VACUUM TRANSPORT DRUM AND METHOD OF MANUFACTURE

BACKGROUND OF THE INVENTION

1. Field of the Invention

The invention described in this specification is primarily intended to be utilized in conjunction with the perforating of coatings by means of a laser beam and is particularly directed to a process for producing a large number of small holes in coatings applied to the surface of vacuum transfer drums used in electrophotographic reproduction apparatus.

2. Description of the Prior Art

It is known to utilize a laser for the purpose of perforating metallic materials. One such procedure is disclosed in U.S. Pat. No. 4,857,698 where a pulsed Nd:YAG laser is used to perforate a flat metal sheet. A removable tape is placed on the side of the sheet opposite to that of laser impact to reduce the formation of burrs adjacent the perforations.

U.S. Pat. No. 4,156,807 discloses an electron beam drilling process in which the workpiece surface first to be penetrated by the beam is coated with a stop-off material of high temperature resistance so that the hot molten spatter will be deposited on the stop-off layer as opposed to the workpiece and thereby prevent the spatter from becoming welded to the workpiece. This stop-off layer, like the tape of U.S. Pat. No. 4,857,698, is removed from the workpiece once all the perforations are formed.

While the above procedures prevent burrs adjacent to the perforations and spatter from being deposited on the workpiece, these procedures do not address the problems of forming multiple holes in nonmetallic substances, such as polyurethane, coated over a metallic substrate material, wicking back of material into a formed perforation, the electrical relationship between a coating and its substrate nor placement of the tape or stop-off material that is impossible or extremely difficult to remove once the perforation process is complete.

While U.S. Pat. No. 5,119,550 addresses the problem of forming multiple holes in non-metallic substances coated over a metallic substrate material and has a tape placement between the coating and substrate to prevent the coating, when initially applied to the substrate from clogging the holes in the substrate, it does not address the problems of polymeric melt, formed during the perforation process, wicking back into the formed perforation.

It is therefore an object of the present invention to provide an apparatus and method for forming very small holes, of uniform size and shape, in the coating of a substrate material without disturbing the electrical relationship between the coating and the substrate.

Another object is to provide an efficient and rapid process for producing a large number of small uniform holes in a polymeric coating covering a metallic drum, by means of a laser beam, to provide a vacuum drum that may be efficiently employed as a vacuum transfer drum in an image forming device.

SUMMARY OF THE INVENTION

There is disclosed herein a new and useful apparatus and method for forming small holes in the polymeric coating of a coated material.

According to a specific embodiment of the invention, a method is provided for making a transfer drum for incorporation in an electrostatic transfer apparatus comprising the steps of:

providing a core with vacuum opening means;

forming a layer of a polymeric material on the surface of the core;

placing a conductive polymeric melt absorbing material between the layer of polymeric material and the core;

aligning a laser with the vacuum opening means;

laser drilling in said layer small holes communicating with the vacuum opening means;

absorbing at least a portion of polymeric melt created by the laser drilling of said polymeric layer with the polymeric melt absorbing material.

A brief summary of the above type is inherently incapable of delineating many facets and features of an invention which are significant and important to indicate the many advantages of an invention as are normally apparent to one skilled in the art after a detailed study of the invention. It is considered that such items will be apparent to one skilled in the art from a detailed consideration of the remainder of this specification, the appended claims and the accompanying drawings.

An advantage to the above is that the polymeric material removed from the polymeric coating, to form the perforations, is prevented from wicking back into the formed perforation, since said polymeric material while in a somewhat gel state is absorbed through the use of a conductive absorbing material located between the polymeric coating and its substrate.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENT

Figure 1:
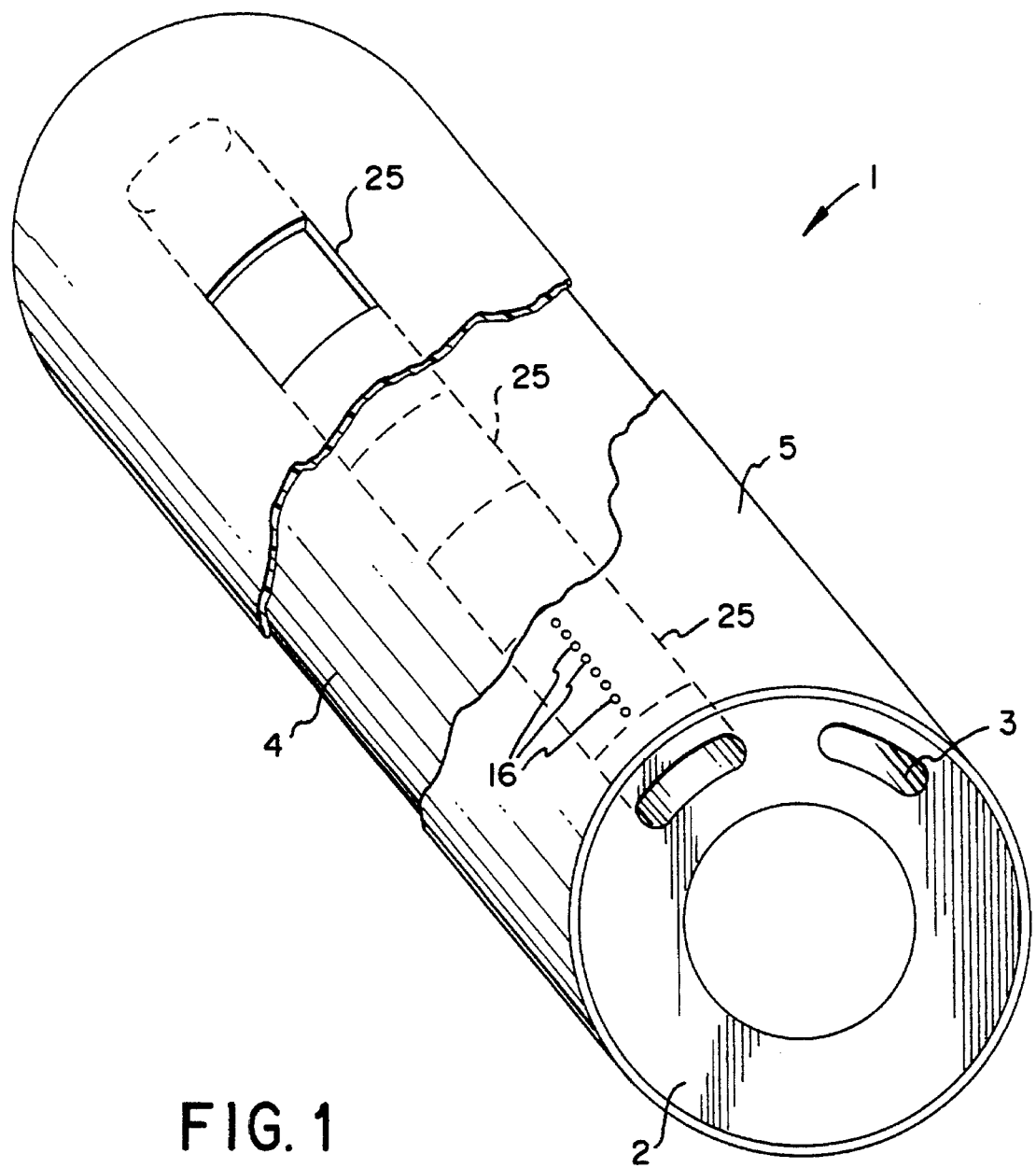
FIG. 1 is a perspective view of the vacuum drum, in accordance with the present invention, with portions of both the urethane coating and the absorbent material cut away.

The apparatus of the preferred embodiment will be described in accordance with a vacuum transfer drum for an electrophotographic reproduction apparatus and because such drums are well known, the present description will be directed in particular to elements forming part of, or cooperating more directly with, the present invention. Apparatus not specifically shown or described herein are selectable from those known in the art.

While the present invention is susceptible to embodiments of many different forms, there is shown in the drawings and hereinafter described, in detail, a preferred embodiment of the invention. It should be understood, however, that the present disclosure is to be considered an exemplification of the principles of the invention and is not intended to limit the invention to only those embodiments illustrated and/or described herein.

For ease of description, all apparatus will be described in their normal operational position, and terms such as upper, lower, horizontal, etc., will be used with reference to normal operating positions. All apparatus, however, may be manufactured, stored, transported and sold in an orientation other than the normal operational positions described.

All references cited in this specification and their references are incorporated by reference herein where appropriate, for appropriate teaching of additional or alternative details, features and/or technical background.

Throughout the following description, similar reference characters refer to similar elements or members in all of the figures of the drawings.

Figure 2:
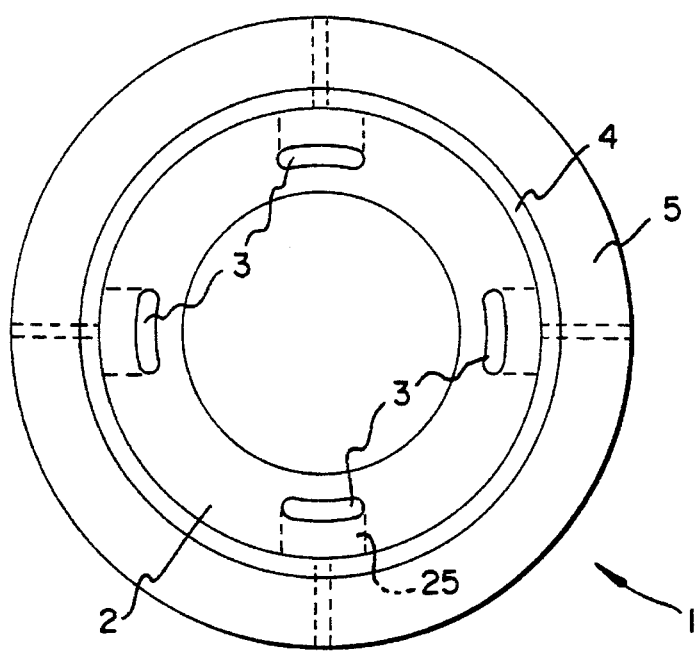
FIG. 2 is an end view of the vacuum drum in accordance with the present invention.

Referring now to the drawings, and especially to FIG. 1, where the drawings are for the purpose of illustrating a preferred embodiment of the invention, and not for limiting same, there is shown a vacuum transfer drum 1 composed of a core 2, such as a metallic substance, having vacuum chambers 3, as known in the art, which are open to the surface of core 2 at various vacuum ports 25. Covering at least vacuum ports 25 of core 2 is a conductive absorbent material 4, such as a conductive paper or tape having a density similar to that of the average kitchen paper towel and such as are manufactured by Anti-Static Industries, see FIG. 2. Absorbent material 4, in turn is covered by a polymeric coating 5, such as polyurethane containing an anti-static filler. In this manner, absorbent material 4 is sandwiched between core 2 and coating 5 and due to its conductive nature, it will not interfere with the electrical grounding between the anti-static filler in coating 5, and drum core 2. Absorbent material 4 is either adhered to core 2 by an adhesive or simply by being compressed between coating 5 and core 2. Since absorbent material 4 does not interfere with the grounding between the anti-static filler of coating 5 and core 2 of drum 1, any material that contacts drum 1, when drum 1 is placed in use is less likely to stick to drum 1 due to the anti-static filler contained in coating 5, once the vacuum holding that material to drum 1 is removed. This reduces the chances of jamming caused by static build up on transfer drum 1 when transfer drum 1 is in service in an electrophotographic reproduction apparatus.

Figure 3:
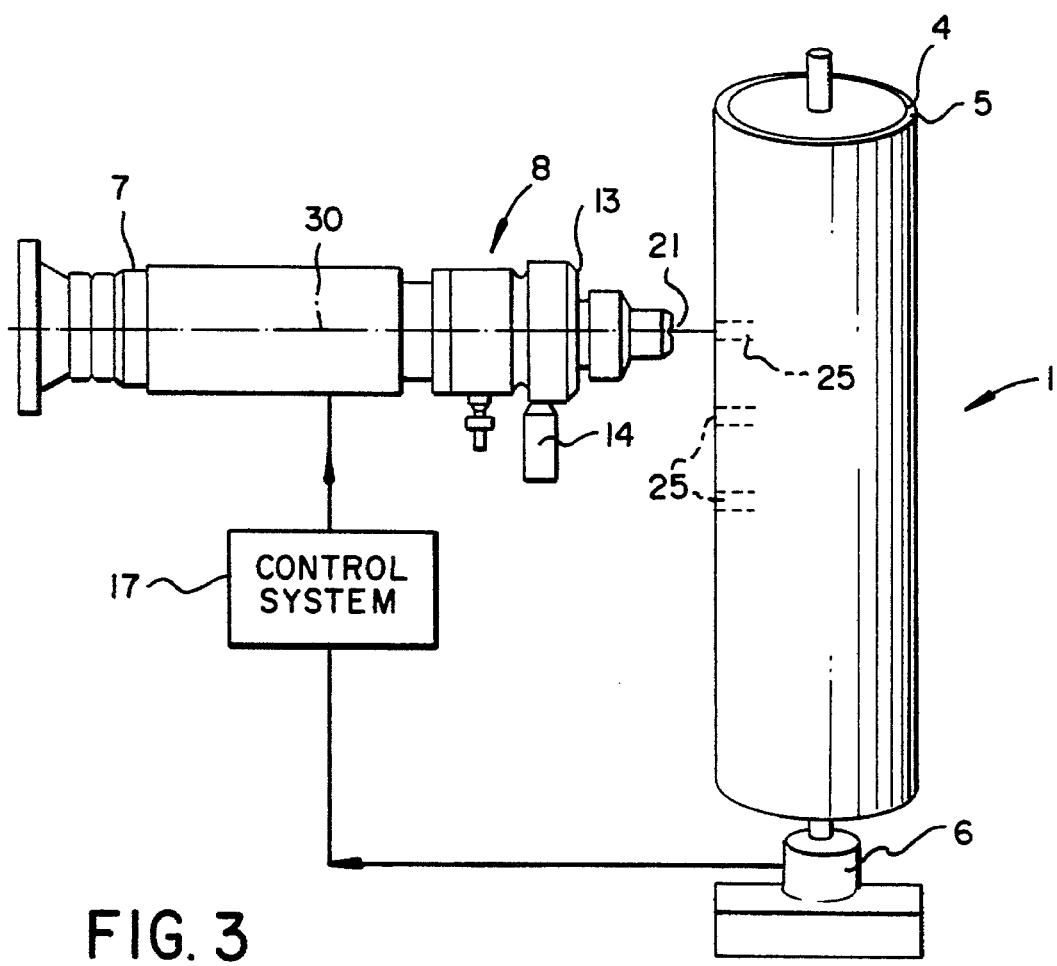
FIG. 3 is a side view of the vacuum drum mounted on a rotating platform to position the drum for laser perforation, in accordance with the present invention.
Figure 4:
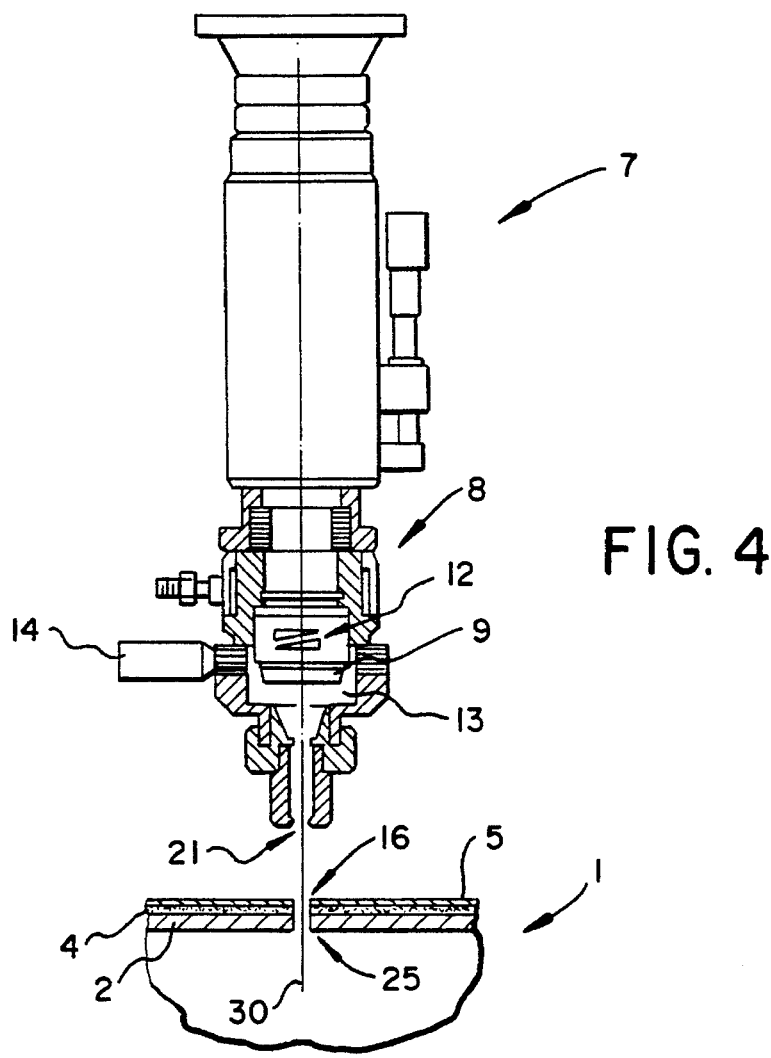
FIG. 4 is a side view of the laser used to perforate the coating of the vacuum transfer drum, in accordance with the present invention.
Figure 6:
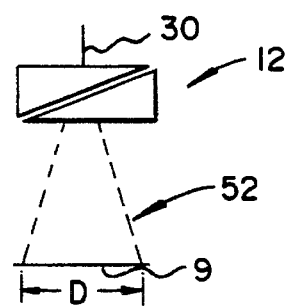
FIG. 6 is a side view of the rotating wedges which cause the laser beam to rotate in a cone shaped pattern, in accordance with the present invention.

As shown in FIG. 3, in order to align vacuum ports 25 of drum 1 with a laser 7, such as a CO2 gas laser, having a wavelength capable of both thermally cutting or perforating polymeric coating 5 and vaporizing absorbent material 4, drum 1 is placed in a rotary platform fixture 6 to incrementally position vacuum ports 25, of drum 1, into alignment with a moving spot beam 30 of laser 7. A computer numerically controlled system 17 controls the horizontal, vertical and rotational positioning of drum 1 while in fixture 6, as is known in the art. After control system 17 positions drum 1, through the movement of fixture 6, system 17 activates beam 30 of laser 7 so that beam 30 passes through a scanning boring head 8, such as the boring head manufactured by Laser Mechanisms, Inc. of Southfield, Michigan. Referring now to FIG. 4, optical rotating wedges 12, as are known in the art, of boring head 8, interact with beam 30 to cause beam 30, upon exit-from wedges 12, to rotate in a cone pattern 52 (see FIG. 6) at a high rate of speed. As beam 30 of laser 7 travels in cone pattern 52, it impacts, in a circular pattern, of desired diameter D, upon the surface of a stationary focal lens 9. Stationary lens 9 then focus this circular laser pattern onto coating 5 of drum 1 for the purpose of perforating coating 5. Before, however, beam 30 impacts upon coating 5 it passes through a gas jet 13, to be later discussed. Upon impact with coating 5, above anyone of vacuum ports 25, the high speed circular movement of focused beam 30, due to its wavelength and power output, such as a power output in the 40 watt range, creates a small hole or perforation 16, in coating 5 and absorbent tape 4. Such perforation, depending adjustments to CO2 laser 7, may have a very wide range of diameters. The preferred diameter range, for the normal transfer drum 1, 20 however, is between 0.010 and 0.10 inches in diameter, see, for example, U.S. Pat. No. 5,006,900 for a discussion of preferred size vacuum holes for some applications. While a 40 watt laser 7 was used as an example, laser 7 is not limited to that power output. The power output of laser 7, however, should be limited so as not to cause, by the thermal melt cutting of coating 5, a perforation larger in diameter than the diameter of perforation 16 required, yet powerful enough to thermally transform all the material being cut, during each cutting rotation of beam 30, into a resin melt as beam 30 forms perforation 16.

Figure 5:
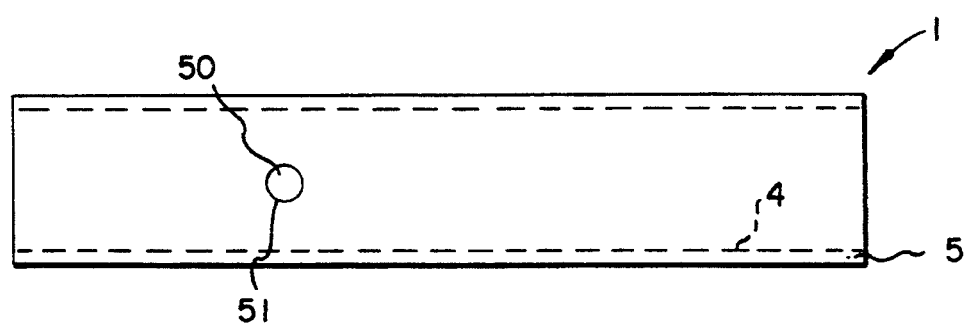
FIG. 5 is a front view of the vacuum transfer drum, in accordance with the present invention, showing the outline of a thermal cut and the material within the cut to be removed to form the perforation.

Depending upon the size of perforation 16 to be formed, laser 7, in the process of forming perforation 16, causes one of two things to occur. The first is the formation of a urethane plug 50 in combination with a urethane melt. Plug 50 represents the interior core portion of thermal cut 51 (see FIG. 5) which was not affected by the thermal cutting process, since it was not in the immediate vicinity of the focal point of beam 30. The urethane resin melt, of a gooey or sticky consistency, represents that portion of coating 5 that was in the immediate vicinity of the focal point of beam 30 during the thermal cutting process. The above two component result, however, is not favored, since plug 50 has a tendency to fall through vacuum port 25, located below pug 50, and into vacuum drum 1. Plug 50, then, unless removed, becomes a source of vacuum blockage when vacuum transfer drum 1 is later placed into service. The second is the formation of only the heretofore mentioned resin melt, when the diameter of perforation 16, to be formed in coating 5, is limited such that all material that must be removed, to form perforation 16, is in the immediate vicinity of the focal point of beam 30 during the formation of perforation 16. The size of perforation 16 and the power of laser 7 determines what one of the above two situations will occur, with it being understood that with any increase in the power of laser 7, there is a corresponding increase in melt and if too much melt is produced, the diameter of perforation 16 formed will be so large so as to preclude the creation of small perforation 16 in the 0.010 inch diameter range sometimes used in certain vacuum transfer drum 1 operational requirements.

If perforation 16, to be thermally cut, are of such a diameter that the energy from laser 7 is insufficient, during a single rotation of beam 30, to transform or convert all the urethane that must necessarily be removed to form the desired diameter of perforation 16 into urethane melt, then the undesirable plug 50 will be formed. To prevent this, the focal point of beam 30 is initially caused to move in a small enough circle that beam 30 is capable of transforming into resin melt all the material it removes during each rotation.

The diameter of the circle that beam 30 travels is then gradually increased until the desired diameter of perforation 16 is reached. By use of this spiral type cutting pattern the formation of plug 50 is prevented, since beam 30 of laser 7 is of sufficient power or energy to cause all coating 5 removed, during each rotation of beam 30, to be thermally transformed into a melt as the rotational diameter of beam 30 is gradually increased to form the desired diameter of perforation 16. During this process, however, the energy of laser beam 30 is controlled so as not to be excessive to the point where it melts coating 5 to such an extent as to produce perforation 16 of a larger diameter than required. The gradual increasing of the spiral pattern and the thermal cutting ceases when the desired diameter of perforation 16 is reached without the formation of urethane plug 50. It being understood that if the diameter of perforation 16 is of such a small size that laser 7 has sufficient energy, during each rotation, of a constant diameter, of beam 30, to transform or convert, into urethane resin melt, all that urethane that must necessarily be removed during each cutting rotation, then beam 30 will be programmed so as not to increase the diameter of its rotation during the thermal cutting process for that particular perforation 16.

Referring now to FIG. 4, as beam 30 of laser 7 thermally cuts through urethane coating 5 and transforms said urethane coating into urethane resin melt, a gas, such as oxygen or air, will be released through gas jet 13 to flow through nozzle 21 and impact upon the surface of coating 5. This gas, due to the combination of the gas supply pressure and the dimensions of nozzle 21, both of which may be varied for specific operations, upon contact with the resin melt, forces said urethane resin melt laterally, toward the outer circumference of perforation 16 and toward absorbent material 4, as each perforation 16 is formed. The force of the gas from nozzle 21 impacting upon the urethane resin melt, however, is insufficient, by choice, to cause tape 4 to break and therefore the melt resin is prevented from entering vacuum chamber 3 through vacuum port 25 where it could later solidify and cause the same problems, in the operation of vacuum transfer drum 1, as the heretofore mentioned plug 50 has a tendency to cause. Since the urethane resin melt is prevented from entering vacuum port 25, it must move laterally, under the force of the gas from nozzle 21 toward the outer circumference of perforation 16 where it will be absorbed by absorbent material 4 and becomes trapped within absorbent material 4 to solidify without any adverse effect to the vacuum or electrical operation of vacuum transfer drum 1, when vacuum transfer drum 1 is subsequently placed into service. This trapping of the resin melt, within absorbing material 4, prevents the resin melt from both wicking back, as is the tendency of such resin melts generated by laser formation of small diameter perforations, and from entering vacuum chamber 3 where it would have the potential to cause adverse effects on the operation of drum 1 when placed into operational service.

The heretofore mentioned gas jet assembly 13 and nozzle tip 21, as shown in FIG. 4, is located between stationary focusing lens 9 and drum 1. As the gas is fed from a supply source, not shown, but known in the art, through a supply tube 14 into gas jet assembly 13, beam 30 of laser 7 thermally cuts into coating 5 of drum 1. The supply pressure of said gas forces the gas through nozzle tip 21 onto the surface of drum 1 and into perforation 16 as perforation 16 is being formed by beam 30 of laser 7. The dimensions of gas nozzle tip 21 are such that nozzle 21 is large enough to accommodate the focused circular cutting pattern formed by stationary lens 9 from cone shaped pattern 52 (see FIG. 6).

By dimensioning gas nozzle tip 21 in this manner, there is no interference between the circular cutting pattern of beam 30 and the interior of gas nozzle tip 21 as beam 30 thermally forms perforation 16 to its desired diameter. The force of the gas flow from nozzle tip 21, which is concentrated by nozzle 21 along the axis of perforation 16, both prevents cutting debris from being directed back to stationary focusing lens 9 and forces the urethane resin melt, created by the thermal cutting process, toward and into absorbent material 4, where the resin melt is trapped and solidifies, thereby preventing any tendency for the urethane resin melt to wick back into perforation 16.

In operation, and as shown in FIG. 3, vacuum transfer drum 1 is placed in rotary fixture 6. Rotary fixture 6 is then rotated, moved horizontally or vertically or moved through a combination of all said motions, by control system 17, until drum 1 is positioned with one of the many vacuum ports 25, of drum 1, in line with beam 30 of $CO_2$ laser 7. Upon positioning beam 30 in line with drum 1, beam 30 is activated and directed through a set of rotary optic wedges 12 to cause beam 30 to spin in a cone shaped pattern 52 (see FIG. 6). The base of said cone, being a circle of a cutting diameter necessary to form the required size perforation 16 in coating 5. If, however, the diameter of perforation 16, to be formed, necessitates the removal of more urethane than the power of laser 7 is able to convert or transform, during each revolution of beam 30, into melt, then beam 30 of laser 7 will be caused to rotate in an initial spiral of small diameter and thereafter in a spiral of constant increasing diameter until the desired diameter of perforation 16 is reached. In forming perforation 16 by either manner, only that amount of urethane will be thermally cut from coating 5, during a single cutting rotation of beam 30 that the energy from laser 7 can convert fully into resin melt without the formation of urethane plug 50.

Notwithstanding that perforation 16 may be produced by either of the above methods, prior to beam 30 impacting on the surface of coating 5, the coned shaped rotating pattern 52, will upon impact with stationary lens 9 be focused, by lens 9, such that beam 30, upon impact with coating 5, will produce the desired spiral or circular thermal cutting pattern. The now focused cutting pattern of beam 30 is then passed through gas jet assembly 13 as gas jet assembly 13 directs the gas from supply 14 through nozzle 21. In this manner, as beam 30 of laser 7 thermally cuts urethane coating 5 to form each perforation 16, gas from nozzle 21 forces the thermal melt, from the thermal cutting process, into and toward the outer circumference of perforation 16. The tendency for the melt to adhere to the wall of perforation 16 and wick back into perforation 16, is thereby prevented by the constant force of the gas, from gas assembly 13, entering perforation 16 and moving such melt laterally toward the outer circumference of perforation 16 and toward absorbent material 4. Upon the melt making contact with absorbent material 4, the capillary action of absorbing material 4 attracts the urethane resin melt into absorbent material 4 where it is trapped and solidifies. The perforation process is completed once laser beam 30 completely cuts through coating 5, the melt has been absorbed by absorbent material 4 and laser 7 has vaporized that portion of absorbing material 4 that it makes contact with at the interface of coating 5 and core 2.

By repeating the above process a number of clean perforation 16, of constant diameter, are formed in coating 5 and absorbent material 4, of drum 1. These perforation 16, in combination with vacuum ports 25, provide a number of small vacuum channels between vacuum chamber 3 and the surface of coating 5. It is these small vacuum channels that then channel the vacuum force exerted by vacuum chambers 3, of vacuum drum 1, such that vacuum drum 1, when placed into operation, will efficiently transport a sheet in an imaging apparatus.

While the invention has been described in detail with particular reference to a preferred embodiment thereof, it should be understood that variations and modifications can be effected within the spirit and scope of the invention.

We claim as our invention:

1. A method of making a transfer drum for incorporation in an electrostatic transfer apparatus comprising the steps of:

providing a core having an outside surface with vacuum opening means;

forming a layer of a polymeric material on the outside surface of the core;

placing a conductive polymeric melt absorbing material between the layer of polymeric material and the core;

aligning a laser with the vacuum opening means;

laser drilling in said layer small holes communicating with said vacuum opening means; and absorbing at least a portion of any of said polymeric material melted by the laser drilling of said layer with the conductive polymeric melt absorbing material.

2. The method of claim 1 wherein the laser is de-energized during relative movement between the core and the laser.

3. The method of claim 1 wherein said step of laser drilling includes moving a spot laser beam in a substantial circular pattern in relation to the layer of polymeric material.

4. The method of claim 1 wherein said aligning step includes mounting the core on a fixture and moving the fixture to align the core to the laser.

5. The method of claim 1 wherein the step of forming a layer of a polymeric material on the surface of the core includes the step of adding an anti-static filler to the polymeric material for preventing static build up.

6. A perforated coated drum comprising:

a core having an outside surface;

at least one vacuum chamber within said core;

at least one vacuum port connecting the vacuum chamber to the outside surface of the core;

a conductive absorbent material covering at least a portion of the core;

a polymeric material covering the absorbent material and having an outer surface; and the absorbent material and the polymeric material having a laser perforation for connecting the vacuum port to the outer surface of the polymeric material.

7. A perforated vacuum transfer drum for use in an electrostatic apparatus comprising:

a core having an outside surface;

at least one vacuum chamber within said core;

at least one vacuum port connecting the vacuum chamber to the outside surface of the core;

a conductive absorbent material covering at least a portion of the core;

a polymeric material covering the conductive absorbent material and having an outer surface; and the conductive absorbent material and the polymeric material having a laser perforation for connecting the vacuum port to the outer surface of the polymeric material.

8. The perforated vacuum transport drum of claim 7 wherein the conductive absorbent material contains at least a portion of the polymeric material removed from the polymeric material to form the perforation.

9. A perforated vacuum transfer drum for use in an electrostatic apparatus comprising:

a core having an outside surface;

at least one vacuum chamber within said core;

at least one vacuum port connecting the vacuum chamber to the outside surface of the core;

a conductive absorbent material covering at least a portion of the core;

a polymeric material covering the absorbent material and having an outer surface; and the absorbent material and the polymeric material having a laser perforation for connecting the vacuum port to the outer surface of the polymeric material.

10. The perforated vacuum transport drum of claim 9 wherein the polymeric material contains an anti-static filler for preventing static build up on the outer surface of the polymeric material.

11. The perforated vacuum transport drum of claim 10 wherein the anti-static filler of the polymeric material is grounded to the core through the conductive absorbent material.

12. A method of making perforations in the coating of a perforated drum comprising the steps of:

providing a core having an outside surface and with vacuum opening means;

forming a layer of a polymeric material on the outside surface of the core;

placing a conductive polymeric melt absorbing material between the layer of polymeric material and the core;

aligning a laser with the vacuum opening means;

laser drilling in said layer small holes communicating with said vacuum opening means; and absorbing at least a portion of any of said polymeric material melted by the laser drilling of said polymeric layer with the conductive polymeric melt absorbing material.

* * * * *